United States Patent [19]

White

[11] Patent Number: 5,002,696
[45] Date of Patent: Mar. 26, 1991

[54] EXPANDED MINERAL PARTICLES AND APPARATUS AND METHOD OF PRODUCTION

[75] Inventor: William R. White, Mission Viejo, Calif.

[73] Assignee: Grefco, Inc., Torrance, Calif.

[21] Appl. No.: 226,956

[22] Filed: Aug. 1, 1988

[51] Int. Cl.$^5$ .................... C04B 14/00; C04B 16/08; C03C 12/00
[52] U.S. Cl. ................... 252/378 R; 106/409; 106/DIG. 2; 252/378 P; 501/33
[58] Field of Search ............. 252/378 R, 378 P; 501/33, 34; 106/409, DIG. 2

[56] References Cited

U.S. PATENT DOCUMENTS

| | | | |
|---|---|---|---|
| 2,021,956 | 11/1935 | Gladney | 252/378 R |
| 2,501,698 | 3/1950 | Stecker | 252/378 P |
| 2,501,699 | 3/1950 | Strecker | 252/378 P |
| 3,779,698 | 12/1973 | Siemssen | 252/378 R |
| 4,183,980 | 1/1980 | Nielsen | 252/378 P |
| 4,401,586 | 8/1983 | Ghiringhelli | 252/378 P |
| 4,448,599 | 5/1984 | MacKenzie et al. | 501/33 |
| 4,520,073 | 5/1985 | Randolph et al. | 252/378 P |
| 4,521,782 | 6/1989 | Collins | 252/378 P |
| 4,547,468 | 10/1985 | Jones et al. | 501/33 |
| 4,592,722 | 6/1986 | Heckmann | 252/378 P |
| 4,664,623 | 5/1987 | Sundermann et al. | 252/378 P |
| 4,767,726 | 8/1988 | Marshall | 501/33 |
| 4,830,797 | 5/1989 | Hornyos et al. | 252/378 R |

FOREIGN PATENT DOCUMENTS

| | | | |
|---|---|---|---|
| 147174 | 1/1988 | Australia | 252/378 |
| 737824 | 7/1966 | Canada | 252/378 P |
| 86/106713 | 11/1986 | World Int. Prop. O. | |

Primary Examiner—Gary P. Straub
Attorney, Agent, or Firm—Lyon & Lyon

[57] ABSTRACT

A non-porous, substantially hollow, expanded mineral product, such as expanded perlite, is produced by uniformly and indirectly heating ore for about 1 to 30 seconds in an expansion chamber maintained at about 1400° F.–2100° F. to produce uncoated particles which exhibit superior short term and long term density stability characterics in liquid systems, and which may subsequently be coated to provide enhanced density stability characteristics.

26 Claims, 9 Drawing Sheets

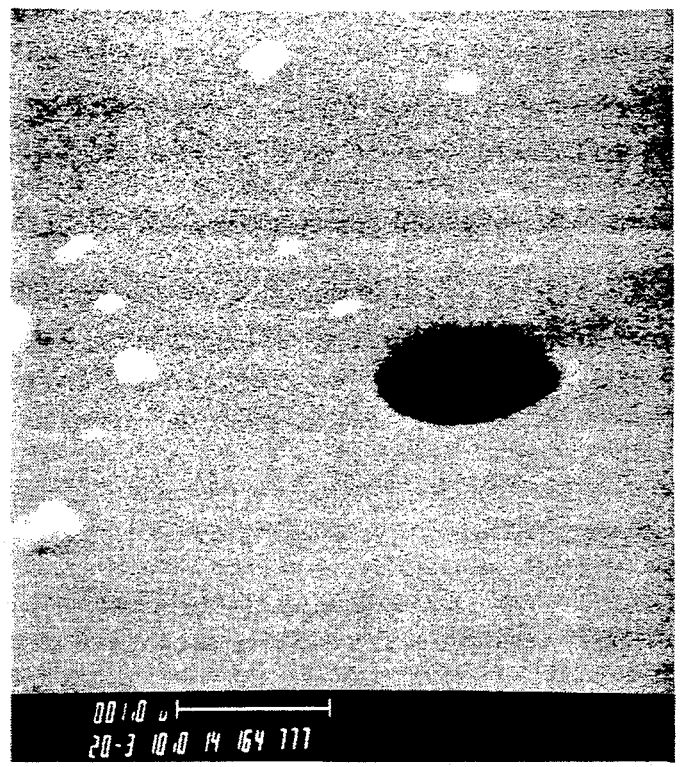
FIG_11.
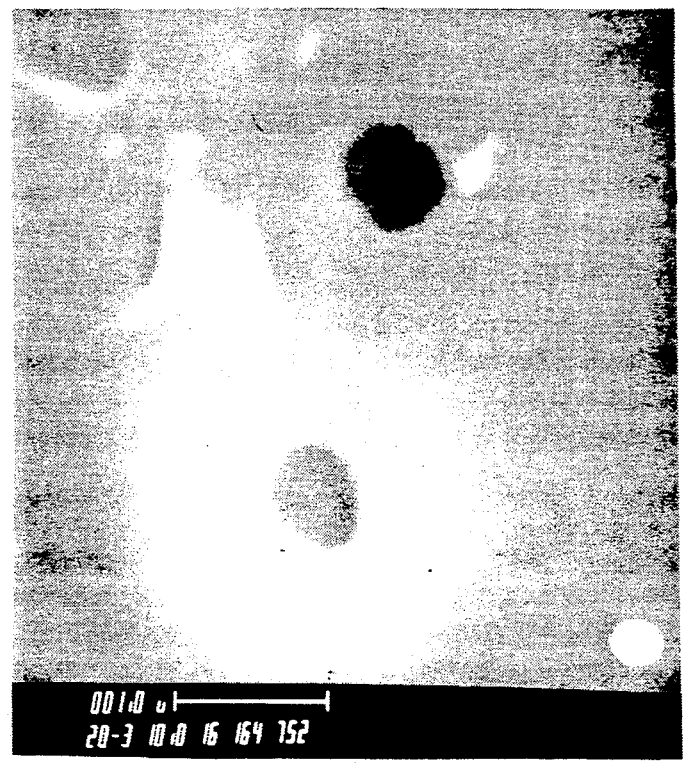
FIG_12.

EXPANDED MINERAL PARTICLES AND APPARATUS AND METHOD OF PRODUCTION

FIELD OF THE INVENTION

The present invention relates to uncoated, essentially hollow, essentially non-porous expanded mineral particles and an apparatus and method for producing the particles. Such particles are useful as filler material in a wide range of applications where a desired goal is to fill a bulk material to achieve certain predetermined densities, costs or other characteristics. The expanded mineral particles of the present invention are produced by expansion of expandable mineral particles within controlled time, temperature and environmental parameters to yield expanded, essentially chambered or hollow, essentially spherical, essentially non-porous particles without requiring a subsequently applied coating to achieve desired durability characteristics.

BACKGROUND OF THE INVENTION

Expanded mineral particles, such as expanded perlite, are well known. It is also well known that both uncoated and coated, expanded mineral particles such as uncoated and coated, expanded perlite may be used as fillers in various industrial applications.

Perlite, the preferred expanded mineral particle material of the present invention, is in its raw, or pre-expanded state a naturally occurring material of volcanic origin. Raw perlite has a high silica content and contains lesser amounts of alumina, sodium, potassium and very minor amounts of impurities. Pre-expanded perlite ore may have a water content which varies from ore to ore. As is well known, when pre-expanded perlite ore containing water is heated to a range of about 1500° F. to over 2600° F. in conventional expansion furnaces, the perlite particles explosively expand as the contained water flashes to steam and form a distribution of particles which contain a relatively high portion of lightweight, chambered, essentially hollow particles. Such conventionally expanded perlite particles are relatively chemically inert and are also resistant to relatively high temperatures. Such conventionally expanded perlite particles have applications in a wide variety of industrial products such as, for example, horticultural aggregate, insulation and other applications where a lightweight, particulate filler material is useful.

Also, recently, such expanded mineral particles such as expanded perlite, especially coated particles, have been found to be useful as a lightweight filler in pastes, putties, cultured marble, explosives and the like.

Processes and apparatus for expanding mineral products such as perlite are well known. Typically, crushed, dried and sized expandable ore is heated in an open flame and expanded explosively, much like popcorn to provide lightweight, chambered, essentially or hollow, porous particles. Specific methods and apparatus for expansion of naturally occurring perlite ores are well known, with numerous specific methods and devices used to provide improved mineral products or other advantages.

Conventionally expanded particles are known to have uses as fillers, but which uses are limited in many instances because of the high degree of porosity of the expanded product. Because of this relatively high degree of porosity, conventionally expanded perlite is inferior to known non-porous synthetic particles such as glass, ceramic, or plastic hollow microspheres for applications that require durable, lightweight fillers. Such applications include uses such as automobile putties, spackling compounds, caulking formulations and explosives among others.

A well-known and persistent problem associated with conventionally expanded mineral products, such as conventionally expanded perlite particles, is their lack of durability or stability. Within the context of the present invention durability or stability refers to the fact that although they may begin as hollow particles, conventionally expanded mineral particles eventually lose much of their hollowness when used in liquid systems or liquid environments. This eventual, and usually gradual loss of hollowness over time is due to penetration of the host liquid through holes and fissures in the walls of the conventionally expanded mineral particles. The host liquid permeates and essentially fills up the cavities within the conventionally expanded mineral particles. Eventually, the host liquid fills all or essentially all of the voids or cavities in the once hollow, conventionally expanded particles. When the host liquid fills the originally hollow, conventionally expanded particles these particles necessarily lose their lightweight property because their cavities no longer are filled with gases such as air, but rather have become filled or nearly filled with host liquid. When such filling takes place, the density and the viscosity of the liquid and particle mixture, or liquid system increases significantly.

There have been numerous attempts to solve this durability problem. Several attempts to overcome this shortcoming are directed to coating the conventionally expanded mineral particles to provide a barrier to influx of host material.

Although it is known that some benefit has been achieved by coating conventionally expanded mineral particles such as perlite, additional process steps and costs result, and the end product coated particles are still not as effective as known synthetic particles such as glass or plastic microspheres when used in liquid systems where time stability is required. With such coated, expanded mineral products the host liquid nevertheless slowly penetrates into the particle cavities over time to raise the density of the liquid system.

Thus, even coated, conventionally expanded mineral products, such as perlite, have been found to be limited to special applications in commercial use where time stability is generally not required.

OBJECTS OF THE INVENTION

It is an object of the present invention to provide a non-porous, hollow, lightweight expanded mineral particle.

It is a further object of the present invention to provide a non-coated, substantially hollow, substantially spherical, expanded mineral particle.

It is a further object of the present invention to provide a coated, non-porous, substantially hollow, lightweight expanded mineral particle by coating a non-porous, substantially hollow, substantially spherical, expanded mineral particle.

It is a further object of the present invention to provide a durable, uncoated expanded mineral particle that has fewer limitations regarding use as a lightweight filler than conventional expanded mineral products.

It is a further object of the present invention to provide a reliable and controlled method for producing a non-porous hollow lightweight expanded mineral product in consistently high yields.

It is a further object of the present invention to provide a method of producing an uncoated, essentially non-porous expanded perlite particle.

It is a further object of the present invention to produce an uncoated, non-porous, hollow expanded perlite particle by introducing processed perlite ore into a furnace and controlling the temperatures and residence time within the furnace to produce the product.

It is a further object of the present invention to provide a furnace for making a substantially non-porous, substantially hollow, substantially spherical, lightweight expanded mineral product.

SUMMARY OF THE INVENTION

The present invention includes lightweight expanded mineral particles which are uncoated, substantially non-porous, substantially hollow and generally of a substantially spherical external shape and which can be used as a lightweight filler material. The present invention also includes these substantially non-porous particles also having a coating, which coating may be any of the several conventional coatings and which may be applied to the uncoated particles by conventional method. Preferably the coated and/or uncoated particles are expanded perlite particles.

The invention also includes a method of manufacture of the expanded particles whereby processed expandable mineral ore is relatively uniformly heated to expansion temperatures not to exceed about 2200° F. and maintained at expansion temperature for a relatively long time to provide for relatively even expansion and formation of the uncoated particles of the present invention. The term processed as used in this context in the present invention refers to conventional crushed, dried and/or sized raw ore.

The invention further includes a furnace having a retort, a heat source, a thermal barrier between the heat source and the retort interior and means to control temperatures within the retort to establish suitable expansion temperatures for expandable mineral particles passing therethrough. The furnace also includes means for feeding ore, means for collecting uncoated, expanded, uncoated particles and means for maintaining the interior retort walls relatively particle free. The furnace also optionally includes means for pre-heating the expandable particles, means for creating and maintaining a plurality of temperature zones within the retort and means for varying the rate of flow of ore through the retort at any given ore feed rate through the means for feeding ore.

BRIEF DESCRIPTION OF DRAWINGS

FIGS. 11 is a photomicrograph of a conventionally expanded perlite particle at a magnification of 20,000X.

FIG. 12 is a photomicrograph of a conventionally expanded perlite particle at a magnification of 20,000X.

DETAILED DESCRIPTION OF PREFERRED EMBODIMENTS

Figure 1:
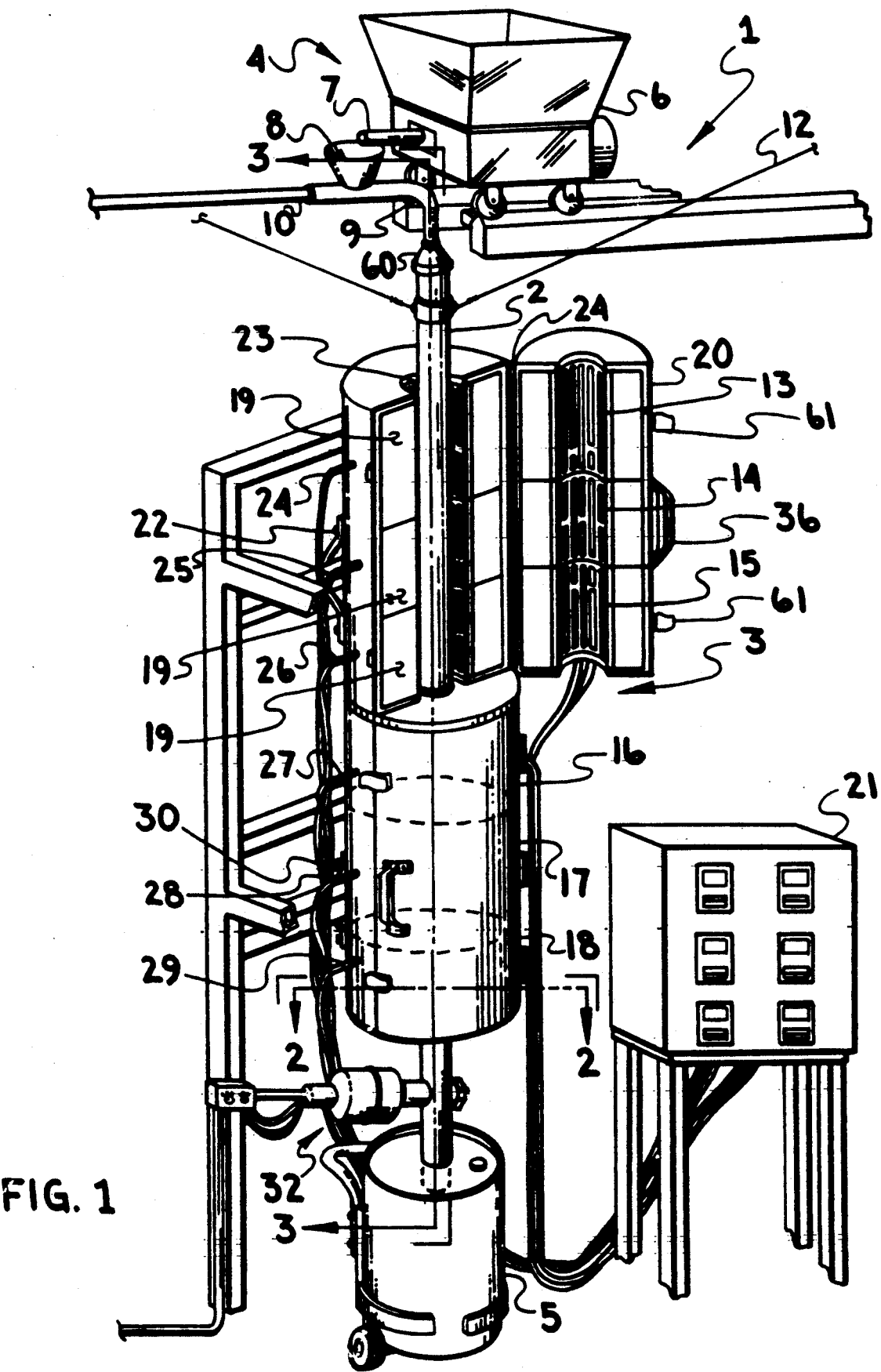
FIG. 1 is a vertical perspective view of a preferred embodiment of a furnace of the present invention used to manufacture expanded, uncoated, non-porous, spherical particles of the present invention.

By reference to FIGS. 1-4, preferred apparatus and methods of manufacture of the particles of the present invention will be described.

Apparatus

The preferred apparatus for making the expanded mineral particles of the present invention is an electric furnace 1 which includes retort 2, a heat source 3, feeder 4, air hammer 32 and particle collector 5.

Processed perlite ore is placed in feeder 4 which includes a conventional volumetric feeder 6, discharge tube 7, funnel 8, feed pipe 9 and air injector 10. Volumetric feeder 6 discharges the raw ore at a predetermined rate, such as 100 pounds per hour through discharge tube 7 into funnel 8. Funnel 8 drains into furnace feed pipe 9 which is provided with an optional air injector 10 to provide for a predetermined flow of air, such as 0.015 to 1.0 feet/second. Optionally, a plurality of volumetric feeders, furnace feed pipes and air injectors may be used. The optional air injector can be operated by compressed air provided from a remote, conventional air compressor, with conventional regulating equipment to provide a steady source of air flow through retort 2 or by a conventional air blower. The direction of air flow is in the direction of the force of gravity, for reasons relating to desired particle residence time and control of furnace temperature as will be explained in detail later.

Retort 2 is a conventional Inconel TM pipe suitable for electric furnace applications. The retort 2 may be made of mild steel, stainless steel, nickel-chrome alloys, or other high temperature alloys, or other high temperature materials having good strength and heat conduction properties. The retort has an inlet region, an outlet region, an intermediate region known as the expansion chamber or zone, and/or, optionally, a pre-heat region.

The diameter, thickness and length of the pipe may vary according to specific design criteria such as desired material flow rates and whether the pipe will include a pre-heat region. It has been discovered, however, that a 5" I.D., $\frac{1}{4}$" wall thickness, 10' overall length, 8' expansion zone length pipe provides excellent results in a pilot plant scale operation. It is anticipated that an 18" I.D., $\frac{1}{4}$" thick, 14' pipe will be suitable for commercial applications.

The retort walls need not define an expansion chamber having a cylindrical cavity 11 as shown in the preferred embodiment. Other geometries such as rectangular cavities, spherical, or square cavities may be defined by suitable wall material. The expansion chamber region of the retort 2 functions to provide a channel or cavity in which expansion of pre-expanded material takes place and to provide a barrier between the source of heat and the expanding particles. The expansion chamber walls also function to conduct and distribute heat from the primary heat source 2 to create a relatively uniform temperature across the expansion chamber in a direction substantially perpendicular to the flow of particles passing through the expansion chamber. The expansion chamber also functions to provide a physical barrier to prevent damage to the heating elements by the expanding mineral particles.

The expansion chamber wall material should have the properties of or functions of being able to withstand high temperature furnace environments such as is the case with conventional expansion furnaces. The wall material should also be corrosion resistant. The wall material should also be able to withstand particle sticking or capable of permitting some means, such as mechanical agitation, such as an air hammer, to unstick particles from the interior wall.

The retort walls 2 are independently suspended at 12 from a suitable frame, not shown, to provide mechanical support for the chamber at a desired orientation, such as vertical, as shown in FIG. 1. In the FIG. 1 embodiment a cap 60 is positioned at the top of the retort 2 and functions to close the top of cylindrical cavity 11.

The heat source 3 includes a plurality of six heating elements 13-18, insulation 19, jacket 20, and control system 21. The heating elements 13-18, insulation 19, and jacket 20 are hung independently from the retort 2 by conventional means, such as upper bracket 22 and lower bracket 30 to help prevent damage during operation or maintenance. A small air gap 23 is established between the outer wall of the retort 2 and the inner surface of heat source 3. A ¾" air gap has been found satisfactory for the pilot plant furnace. The air gap 23 functions to prevent shorts in the electrical heating elements 13-18 and to provide for heat transfer by radiation from the heating elements to the retort walls. The air gap width will vary from furnace to furnace and must be of sufficient width to perform its above stated functions.

The electrical heating elements 13-18 of the preferred furnace are conventional KANTHAL TM heating elements which are controlled by conventional, constant temperature controllers shown at 21. It is preferred that a plurality of heating elements, each with its own controller, are positioned vertically adjacent to each other within the furnace housing, or jacket 20. It is also preferred that six elements are used so that six heating zones 13-18 are defined within the expansion chamber adjacent to and corresponding to the six heating elements 13-18. The capacity of the heating elements must be sufficient to maintain fairly uniform temperatures of at least about 2100° F. across the expansion chamber for a variety of ore flow rates. For a nominal 5" I.D., ¼" thick, 8' expansion chamber length furnace with an ore feed rate of up to about 100 pounds per hour, a total heating capacity of 24,000 watts is sufficient.

Silicon carbide type heating elements are acceptable, but are not preferred because of their relative mechanical inflexibility in comparison to KANTHAL TM alloy heating elements.

Conventional thermocouples 24-29 are positioned within the furnace 1 between the retort walls 2 and the heating elements 13-18 to provide for temperature monitoring in the different heating zones 13-18. The thermocouples function to help provide temperature control within each zone for proper particle expansion and to provide for safety and protection for the heating elements 13-18.

The electrical heating elements 13-18 are positioned within a layer of conventional refractory material, or insulation 19 such as magnesia oxide or alumina, which in turn is retained within a metal housing or jacket 20. Preferably, for ease of fabrication, maintenance and repair the heat source components of the furnace 1 are fabricated in a clam shell fashion, with conventional handles 36, hinges 24 and clamps 61. Also, as shown in FIG. 1, the upper three heating elements and associated components have been set up to open and shut on the hinges as a single, upper bank of heaters, with the lower three heating elements and associated heaters set up to open and shut as a second, single bank of heaters. A layer of insulation 31 is placed between the upper and lower banks of heaters. Optionally the clam shell arrangement can be provided as a single unit for all heating segments is desired.

Figure 3:
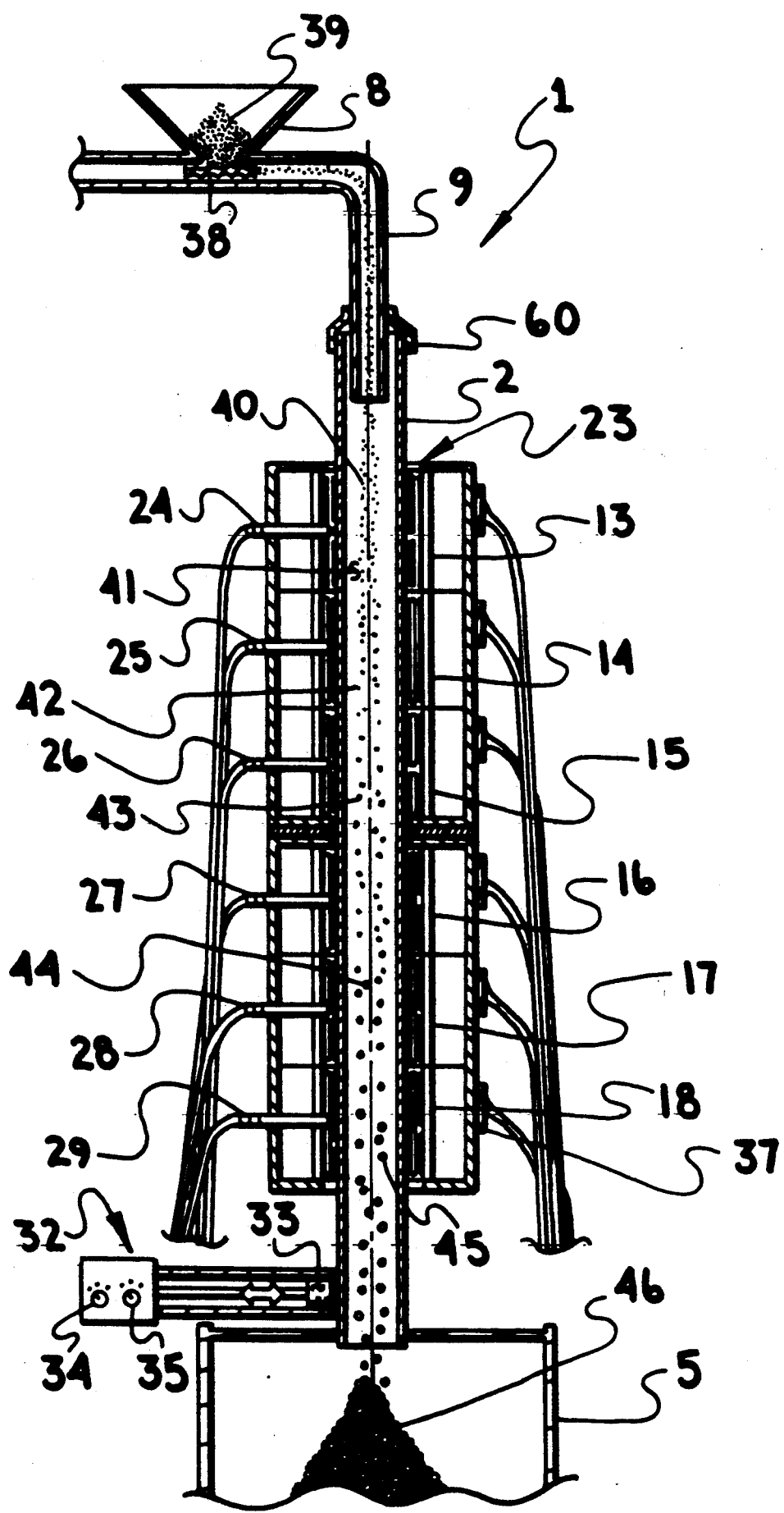
FIG. 3 is a cross sectional view of the FIG. 1 furnace taken along line 3—3 of FIG. 1.

Near the bottom of the furnace 1 and positioned against the retort 2 is air hammer 32, which is a conventional, variable thrust, variable speed pneumatic hammer for shaking loose particles which stick to the inside walls of the retort 2 during operation. It has been discovered that during operation of the furnace some of the expanding mineral particles tend to stick to the inside walls of the retort and that use of an air hammer will prevent build up of such particles on the retort walls. The force and rate of speed of operation of the air hammer piston 33, as shown in FIG. 3, may be varied by conventional controllers, shown at 34 and 35, respectively, and are chosen so that the inside of the retort wall remains relatively particle free. Excessive particle build up on the walls results in creation of poor thermal and flow characteristics within the corresponding region of the retort and can even lead to flow blockage in extreme cases.

At the bottom of retort 2 a collection chamber 5 is positioned to collect the hot, expanded mineral particles. As shown in FIG. 1, the chamber 5 may be a barrel rigged with a conventional dolly for transportation to remote further processing and testing locations. In large scale, commercial operations other collection means such as bins, chambers, etc. which may be associated with transportation systems such as conveyors may be used. Also, coatings may be applied to the uncoated, expanded particles before, in conjunction with, or after collection and separations processing, as desired.

Figure 2:
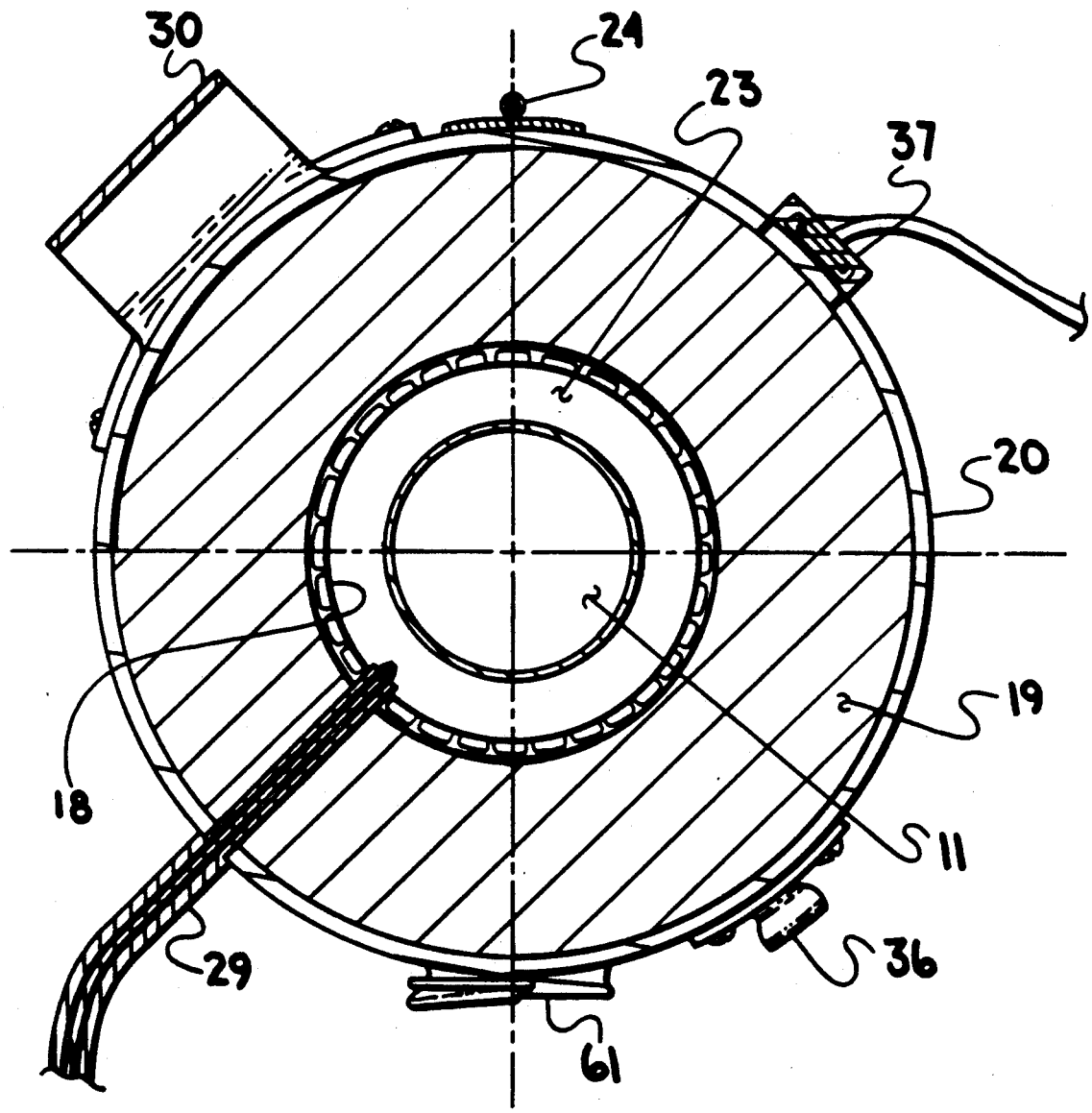
FIG. 2 is a cross sectional view of the FIG. 1 furnace taken along line 2—2 of FIG. 1.

FIG. 2 shows a cross-sectional view of the furnace 1 and illustrates the physical relationship of various furnace components and regions such as the air gap 23 located between the retort 2 and heating element 18 and the cylindrical cavity 11. Thermocouple 29 is shown in position to measure the temperature of the air gap and connector 37 is shown as leading from the power supply to the heating element 18, although the conventional wiring from the connector 37 to the heating element 18 is not shown. Also, lower bracket 30, hinge 24, clamp 61, and handle 36 are shown. Insulation 19 is also shown between jacket 20 and heating element 18.

Method

The preferred starting material of this invention is a mined perlite ore which has been subjected to conventional crushing, grinding, drying and/or sizing processing such as with screens, cyclone separators, high efficiency classifiers, etc. Although the preferred starting material is mined perlite ore, other naturally occurring minerals such as pumice, obsidian, volcanic ash or equivalent materials may also be used in the present invention. Materials which may be considered to be useful in this invention and which are equivalent to those minerals specifically named herein are expandable minerals, i.e., those naturally occurring minerals which may be expanded so that water contained within the mineral may be flashed to steam in a controlled environment to create an expanded, uncoated mineral particle.

The particular sizing of the feed ore is not critical to the present invention. Valuable and useful particles of the present invention can be made from feed ores within the entire range of known ore sizes. However, it has been found that for a given batch of feed ore, the narrower the particle size distribution of the feed ore the more effective the process of the present invention is in terms of increased yield. In other words, it is preferred to have a relatively uniform distribution of particle sizes within the feed ore mixture fed to the furnace to make the expanded mineral product of the present invention. Although is has been discovered that the process of the present invention is useful with a wide range of feed ore sizes, e.g., about 3-3360 microns, it has also been discovered that the yield of preferred product can be optimized by narrowing the size distribution of the ore fed to the furnace. For example, using an ore having a size distribution of 5-300 microns, a post-flotation yield of preferred, uncoated product of 74% was achieved. In comparison a feed ore having an even more narrowly sized distribution i.e., from 105-150 microns, resulted in a post-flotation yield of 94%, for an increase of about 20%. An optimum yield of preferred, uncoated particles can be obtained by narrowing the particle size distribution of the feed ore. In many commercial applications, however, it must be realized that use of a relatively wider distribution of feed ore particle sizes may often be useful because, for a given application the commercial cost of sizing the feed ore to be within a predetermined range must be weighed against the cost of the lower yield and the final properties of a coated product, if desired.

It has also been discovered that the actual particle sizing of the feed ore has a significant impact upon the yield of preferred, uncoated product. For example, the following table shows that feed particles between the range 105 and 150 microns produce a higher yield of post-flotation, uncoated product than either larger or smaller feed particles.

TABLE I

| Feed Perlite Ore, Microns | Post-Flotation Yield, % |
| --- | --- |
| +150 | 84 |
| 105-150 | 94 |
| 75-105 | 91 |
| 53-75 | 87 |
| 44-53 | 78 |
| −15 | 26 |
| 3-300 | 74 |

The yield was determined by weight of dry, expanded, floated particles compared to the weight of the feed ore. Also, it should be noted that the present invention is not limited to the use of different size feed ores which provide the optimum yield or near optimum yields of preferred product because different commercial applications for the end product may require different particle sizes and/or a coating to be applied to the expanded particles.

Figure 4:
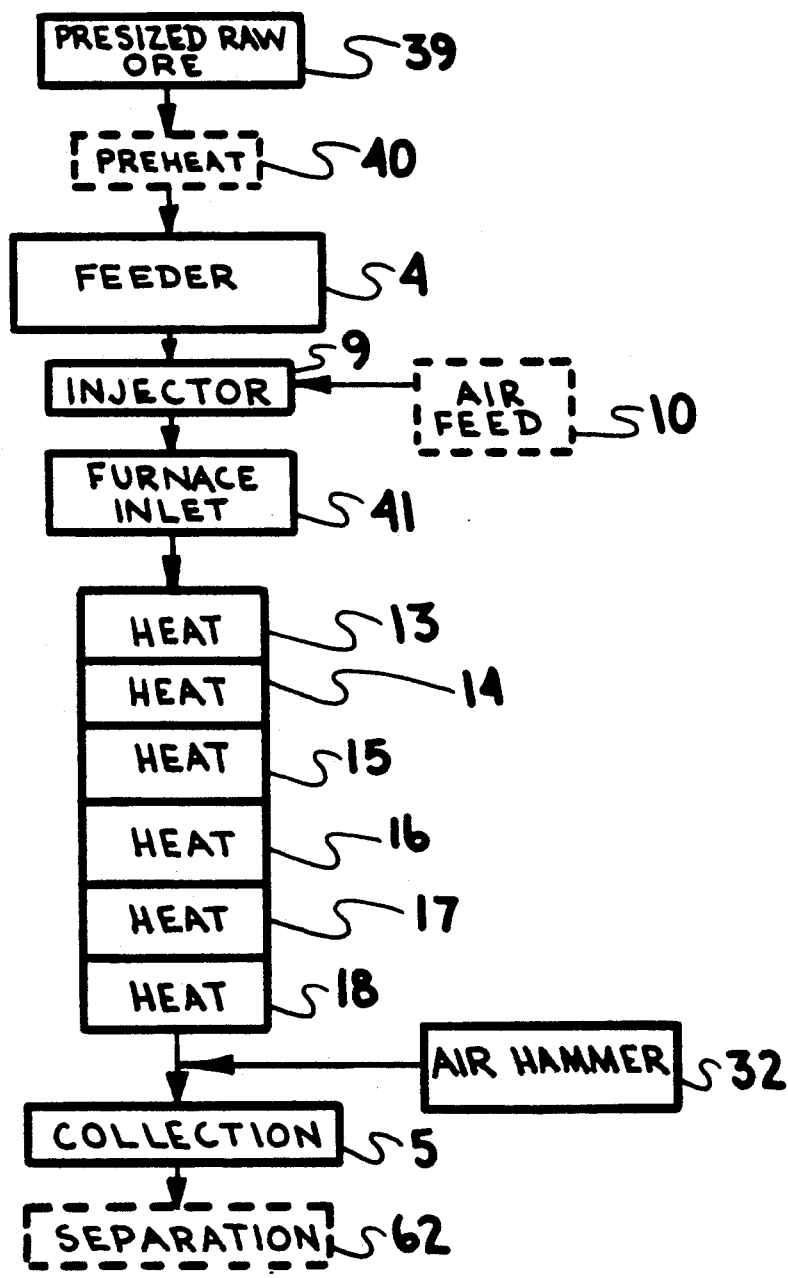
FIG. 4 is a schematic diagram of a method of making the expanded particles of the present invention.

Referring to FIGS. 3-4 the flow path and processing parameters of the preferred method of making the uncoated particles of the present invention will be described.

Presized, expandable, feed ore 39, preferably perlite, is placed in the feeder 4. The ore may be pre-heated at 40, shown in FIG. 4 with dashed lines to reflect this option. The feed ore 39 is crushed, dried, pre-sized, unexpanded and of an irregular shape. The feed ore 39 is then fed through injector 9 with the aid of screw 38 and, optionally with the further aid of an air injector 10, into the furnace inlet 41, as shown in FIG. 3 and schematically in FIG. 4. The unexpanded particles 39 then fall into heating zone 13 and begin to expand as partially expanded particles 40, shown in FIG. 3. As the particles fall through the remaining five expansion zones 14-18, they become more expanded and become more regular, or more spherical in contour, as shown at 42-45 in FIG. 3 not to scale. The particles then fall into the collection chamber 5 as hot, expanded furnace discharge particles 46, shown in FIG. 3. Air hammer 32 is used to jar the retort 2 to keep expanding particles from sticking to the walls of the retort. After collection, the furnace discharge particles 46 are optionally available for further processing, such as air or water separation 62, coating, testing and then packaging and shipping.

The feed ore may be pre-heated or fed at ambient temperature to the furnace. When the ore is fed at ambient temperature, then the upstream heating zones may function as preheating zones rather than as expansion zones. When the ore particles are pre-heated outside of the retort, they are then fed into the top, or upstream end of the retort 2 and permitted to flow through the six heating zones 13-18.

It has been discovered that expansion of perlite ores takes place in the temperature range of about 1200° F. to about 2200° F. for the purposes of the present invention. The preferred range is from about 1400° F. to about 2100° F. The lower temperature in the range varies according to the source of perlite ore used as a feed i.e., its chemical composition.

It has been discovered that operation of the process at temperatures at and above about 2200° F. causes excessive sticking of particles to the retort walls and also results in a reduction in the post-flotation yield of expanded particles when perlite is used.

As shown in FIG. 3, the particles pass through the six heating zones and are not placed in a direct heat environment, but rather are subjected to uniform, indirect heat through the functioning of the retort walls. It is indirect important to the method of the present invention that a zone or zones of relatively constant temperature are created within the furnace 1 so that virtually all ore particles which pass through the expansion zone or zones of the furnace are exposed to the uniform heat. It is believed that within the temperature range of about 1200° F.–2200° F. and preferably between about 1400° F.–2100° F. the perlite particles exist in a relatively plastic form so that relatively uniform vaporization of the particle water to steam occurs, thus permitting a relatively slow expansion of the perlite particle.

The conventional expansion of perlite ore is usually accomplished by passing ground, dried, pre-sized perlite ore into a chamber containing a direct flame at its bottom end directing and forced air flow upwardly. The ore particles often enter at or near the flame, which is believed to be at least about 2600° F., and may reach temperatures exceeding 2600° F. As the particles becomes plastic, the internal water in the perlite relatively immediately flashes to steam. The resulting expanded particles have numerous cracks and fissures and are usually very porous because the escaping steam generated by the rapid, and relatively non-uniform heating of the perlite in the flame blasts through the relatively plastic walls of the rapidly expanding particles.

In the process of the present invention, however, the heat is controlled to provide relatively uniform temperatures within zones to provide lower peak temperatures and to provide relatively longer average residence times in the expansion temperature environment so that a relatively soft, plastic particle is expanded in a relatively gradual way.

In conventional perlite expansion processes, the noise of an expansion furnace can be almost deafening. In contrast, the process of the present invention is accomplished with only a minimum of noise, particularly when the heat source is electrical.

While the furnace heat may be controlled at a single temperature for expansion, it is preferable to heat the retort in a segmented fashion, that is, in multiple zones, with each heating element set at a different temperature, preferably so that the coolest zone is at the feed end and the hottest zone is at the exit at the downstream end of the expansion chamber. The number and length of zones may vary, depending on the type and size of the feed, the feed rate, provision for pre-heating and the temperatures employed for each zone. Any number of zones can be used with all or fewer than all of the zones being heated, thus allowing flexibility in the furnace concerning residence time and temperature profiles. A typical furnace may look like that shown in FIGS. 1-4, with six zones. The length of each zone is optional, with a 12" length having been found to produce good results in a pilot plant operation. A typical temperature profile from top to bottom could be 1000° F. at the top, graduating to 2100° F. at the bottom zone. The perlite gradually heats up as it passes through each zone, and sufficient time and temperature are present to soften the particles to a plastic state. In this way, the tendency of the perlite to expand explosively is harnessed and the expanded mineral particles are less likely to be riddled with the cracks, fissures, pores and holes characteristic of conventionally expanded perlite.

In conventional, open flame expansion processes the feed ores are typically introduced into the hottest region of the expansion chamber first and then are passed to cooler regions of the chamber. The temperatures within any zone across the chamber are also believed to be quite variable, with temperatures in and near the flame quite different from temperatures at other locations. The average particle residence time in the expansion chamber of such a process is also relatively short, is thought to be as short as in the order of milliseconds, and in most instances generally is thought to be less than a second, except for the coarsest of particles; i.e., those particles which are greater than 1000 microns in diameter, which are intended for horticulture aggregate and which require slightly higher residence time.

In sharp contrast, however, the process of the present invention provides for regions which have a relatively uniform temperature across the expansion zone in the direction which is substantially perpendicular to the flow of ore particles. Also, a relatively longer residence time is provided for particles within the expansion zone, such as from about 1 to 30 seconds. Also, relatively lower peak temperatures are used in the present process, with preferred maximum temperatures not to exceed about 2100° F. Also, in the preferred method of the present invention the expanding particles are not exposed directly to the primary heat source, but rather are protected by a thermal barrier which acts to diffuse and eliminate potential hot spots across any given expansion zone.

With the present process, it is believed that substantially all of the ore particles are exposed to the same, relatively uniform, relatively lower temperatures for a relatively longer time than in the conventional processes. These differences in process parameters permit the particle walls to soften and remain plastic during the expansion of the perlite particle by the vaporized water so that the expansion does not occur explosively to leave a porous surface, but rather occurs relatively slowly and uniformly to form a relatively non-porous surface over the entire periphery of the expanded, uncoated particle.

In the preferred method of the present invention the heat source does not come into direct contact with the perlite ore in the expansion zones of the furnace. Rather the retort is heated on its outer periphery by gas heat, such as from gas jets, or heated electrically, such as by conventional coils or elements 13-18 as shown in FIG. 1, or by other known sources of heat energy.

Although the retort 2 is shown in a generally vertical orientation to take advantage of gravity flow of ore from feed pipe 9 to collection tank 5, the orientation with respect to horizontal of the retort is not critical to the method of preparation of the expanded, uncoated particles of the present invention or to the finished product itself.

The dimensions of the retort can vary and can be made in various shapes such as cylindrical, oval, rectangular or square as desired without adversely affecting the present invention. A cylindrical shape as shown in FIGS. 1-3 is preferred because it is easy to obtain and operate as well as efficient to operate. The inner dimensions of the reaction chamber may vary from 2 inches to 10 feet in diameter or width. A diameter or width of from 1 foot to 3½ feet is preferred, with a diameter or width of about 12 inches to about 30 inches the most preferred because these widths provide for more easily controllable thermal uniformity within the heating zones.

The length or height of the expansion region may vary from 2 to 36 feet, or may be even longer as desired within specific production requirements. It has been found that an efficient, small scale production facility may use an expansion chamber length of from 8 to 15 feet. Such a length provides sufficient residence time for the particles. When used in conjunction with augmented gravity feed such as the air injector 10 of FIG. 1 consistent yields of about 70% to 80% of desired product are provided. Although gravity feed by itself produces a particle velocity which yields useful finished product within the scope of the present invention, a slightly higher particle velocity through the expansion chamber than that achieved with gravity feed b itself has been found to provide increased yields of expanded, uncoated mineral particles of the present invention. In general, the length, diameter and shape of the expansion chamber may be determined within the ranges described above and specifically chosen in accordance with the desired volume rate of production and contemplated yield.

Again referring to FIGS. 1-4, the comminuted and/or sized perlite feed ore, which is also preferably dried, is introduced into the top of the vertical, or essentially vertical retort 2 at a rate which depends on the size of the retort 2, the size and source of the perlite feed ore, the temperature profile of the expansion zones and the degree of assisting air flow through the retort 2. Generally, the rate of feed would be such that the particles will have a residence time in the heating zone of about 1 to 30 seconds, depending upon the length of the expansion chamber, the size of the ore feed, and the velocity of the particles due to gravity or gravity augmented by the flow of air or other gases. In the preferred embodiment, gravity is augmented by the application of air or other gas, preferably at the rate of about 0.015 to 1.0 foot/second, although higher or lower rates may be used, as desired, to influence the velocity of the feed ore through the expansion chamber and to disperse the particles to be expanded. The air may be supplied, preferably, at the entrance of the chamber by means of an air blower or air injector 10 or other air source so as to push air through the chamber. Alternatively, a negative pressure may also be created at the exit of the chamber by applying a suction with an air blower or other means to pull air through the chamber. Should the retort 2 be disposed horizontally or at another angle, then relatively more air flow is required to move the ore through the chamber and disburse the particles within the chamber than in a vertically oriented retort.

Ore feed rates in the range of about two pounds per hour to 10,000 pounds per hour may be used, with preferable feed rates being about 300 to 2,000 pounds per hour depending on the size of the furnace and the heat energy available to cause the ore expansion as contemplated in the present invention.

The temperature range employed in the furnace 1 is from about 600° F. to about 2,600° F., preferably about 800° F. to about 2200° F., and most advantageously about 900° F. to 2100° F. as discussed above and depending on whether the furnace is to be used with or without external pre-heat. Within the expansion chamber the temperature is controlled by conventional means with electric heating elements 13-18 surrounding the retort walls to provide for indirect, relatively uniform temperature throughout the entire length of the chamber as well as relatively uniform temperature across the chamber diameter. Also, the electric elements 3 may be programmed, by conventional means, to provide gradient zones within the expansion chamber so that different heating zones 13-18 within the expansion chamber may have different temperatures. When heating zones of different temperature are used in the process of the present invention it is preferred that a temperature profile having lower temperatures such as about 900° F. at the upstream end of the expansion chamber and gradually increasing in temperature to a high temperature of about 2,100° F. at the downstream end of the chamber be used. Within the expansion chamber length and between the lower temperature of 900° F. and upper temperature of 2,100° F., heating zones may be established by controlling the heat output of electrical heating elements 13-18. For example six such zones have been found to produce excellent results in a pilot plant operation when used for both pre-heat and expansion functions. It is also preferred that the various heating zones between the high and low temperature ends of the expansion chamber be set up to be increasing in temperature from the low temperature to the high temperature end. The number of and temperatures in the thermal gradient zones, or heating zones may be determined by feed rate, ore source, and/or feed particle size. For example regarding ore sizes and types, it is known that perlite ores mined from one location will expand differently than perlite ores mined from other locations. Also, finer particles must be thermally treated differently than coarser particles because finer perlite particles heat up faster, as is well known. There is a danger of "deadening" the feed when heating particles incorrectly. Deadening as the term is commonly used in the expanded perlite industry refers to ore which has little or no moisture content available for expansion by the time expansion temperatures are reached and is therefore difficult to impossible to expand well. Feed rates may then vary because of the above factors and the number of zones and their respective temperatures would require adjustment.

Cost advantages may be realized in the present invention and expansion chamber efficiency may be maximized by pre-heating the ore feed using inexpensive, conventional sources of heat. For example, external pre-heating can be used in the range of 300° F. to 900° F. depending on the ore type, feed rate, particle size and the chosen type of pre-heating apparatus employed.

As mentioned before, the residence time of the perlite ore particles within the expansion chamber may vary from 1 to 30 seconds. The total time in the retort, or pipe 2 will necessarily be greater because of the length of the pipe upstream and downstream of the expansion zone or zones, as desired. After the ore falls through the expansion chamber and has been expanded in accordance with the parameters as described above, the expanded particles fall through the bottom of the expansion chamber, downstream of the location of the air hammer 32 and then to any suitable collection area preparatory to any further processing including coating, if desired. As shown in FIG. 1, collection tank 5 collects the furnace discharge expanded, uncoated perlite particles 46.

Expanded Mineral Particles

The expanded, uncoated furnace discharge mineral particles 46 of the present invention can be collected and packaged by conventional methods. The expanded mineral products of the above described method of present invention optimally yield a distribution of particles having approximately 60% to 90% of uncoated, non-porous, expanded, substantially hollow particles. The remaining 10% to 40% of furnace discharge particles 46 collected are generally poorly expanded, unexpanded, or over expanded particles which typically are heavier and can be rejected by additional separation processing, if desired. For example, a liquid collection and selection system may be used to separate the desired particles, which will float, from undesired or reject particles which will sink to the bottom of the liquid. In such a flotation process approximately 100% separation is easily obtained. Typically, the floating particles are then dried, weighed and compared to the processed feed ore weight to determine the post-flotation yield. Similarly, the reject particles may also be separated from the acceptable particles by known air classification methods, due to the differences in nominal density of the acceptable particles compared to the nominal density of the poorly expanded, unexpanded or over expanded reject particles. Optionally, the desired particles or the furnace discharge particles may be coated conventionally to further enhance the particles resistance to penetration with the particles' interiors by outside, liquid agents.

It has been found that applying a suitable, conventional coating to the expanded, uncoated particles of the present invention further enhances the durability or stability of the product and brings about a reduction in bulk or loose weight density as well as true particle density. Conventional silicone or silane coatings such as dimethyl silicone, dimethydichlorosilane, titanates, zirconates and others known within the field of the invention may be used. Coatings which are considered to be equivalent to these specifically named coatings and therefore within the scope of the invention are those which may be applied to the expanded particles to cover substantially their entire surface area to change the density and/or stability characteristics of the coated compared to the uncoated particles. For example, it has been found that coating the expanded, uncoated perlite particles of the present invention with up to 2% by weight of the uncoated weight or more of a suitable silicone will lower the bulk or loose weight density by as much as about 1 16/ft$^3$ while the true particle density will be decreased by up to about 0.02-0.05 gm/cc. This enhanced property due to the coating is significant because it reduces the very important, usage factor of the commercial expanded perlite product when used as a lightweight filler further improving the economics of the end products. In other words, fewer particles must be added as a filler in order to achieve desired system properties and thus cost savings result because the coating is presently more economical than an increased amount of uncoated, expanded particle needed to achieve the desired system properties. It has also been found that the coatings act to deduct the particles and produce a product which flows better than the uncoated, expanded particles of the present invention.

Coated and/or uncoated particles of the present invention may be used as fillers in numerous systems having liquid, paste or loose particulate flow characteristics for a wide range of applications. Accordingly, it is intended that compositions which are mixtures of such particles with host materials that are liquids, pastes, and/or dry particulate particles are specifically included within the scope of the present invention. Preferably, when such mixtures are either in a paste or liquid form they must have a viscosity of greater than about 10,000 centipoise so that the particles do not rise and tend to float on the surface of the host material. Although the lowermost useful viscosity value may vary according to the density of the particles used and the specific application intended, it has been found that a lower value of about 10,000 centipoise is acceptable for a wide range of applications.

One of the preferred, expanded uncoated product particles of the present invention is obtained by using feed ore u having a size range of 3-44 microns, or 325 mesh. This feed ore size distribution gives expanded product particles of essentially minus 149 microns, or 100 mesh. Another useful particle size distribution is made from a feed ore size range of 3-840 microns, or 20 mesh. This feed produces minus 2,000 micron, or 10 mesh, finished, expanded uncoated perlite particles.

Conventionally, sieve sizes (U.S. standard or other designations) are used to describe perlite ores and products. Standard sieve sizes generally correlate directly with micron sizing. However, because the smallest U.S. standard sieve size generally used is 400 mesh or 37 microns, and because the present invention pertains to useful expanded mineral particles well below that size, i.e., 3 microns, designations of sizes in microns are used throughout. Where appropriate, equivalent U.S. standard sieve sizes are also given.

The expanded uncoated mineral particles of the present invention, such as expanded perlite, are durable, non-porous, uncoated, relatively hollow, relatively spherical, relatively lightweight particles. The expanded uncoated mineral particles of the present invention typically have a nominal, or true density as measured by an air comparison pycnometer, in the range of 0.05-1.0 gm/cc, with preferred expanded mineral particles of the present invention within the range of 0.10-0.50 gm/cc. Conventional expanded perlites are typically characterized and measured by bulk or loose weight density, which is not the same as nominal or true density. Bulk density is usually somewhat lower. Bulk density is a physical characteristic which includes air volume in the container between the particles while nominal density is a performance characteristic which does not include air volume between the particles. Expanded perlites manufactured by conventional processes have nominal densities as measured by an air comparison pycnometer of, typically, 0.7-1.2 gm/cc and higher and, additionally, have porous walls and other distinguishing physical characteristics. When these particles are coated their corresponding air comparison pyrometer values and bulk densities will decrease, as illustrated above.

The expanded, coated and/or uncoated mineral particles of this invention are essentially non-porous within the stated ranges and are durable in that they exhibit relatively stable density in liquid systems over various periods of time as measured by appropriate tests. They are thus distinguished in properties and applications over conventionally expanded mineral particles such as perlite, whether the conventionally expanded mineral particles, such as perlite, are coated or uncoated.

By reference to photomicrograph FIGS. 5-12, the particles of the present invention are also clearly distinguishable visually, with the aid of a scanning electron microscope, from the conventionally expanded, uncoated perlite particles. In general the expanded particles of the present invention are substantially spherical in shape, and have a relatively smooth, continuous surface, whereas the conventionally expanded, uncoated mineral particles such as perlite have irregular shapes and have clearly visible holes, cracks, crevices, pores, fissures and other features which readily distinguish themselves from the expanded mineral particles of the present invention.

Figure 5:
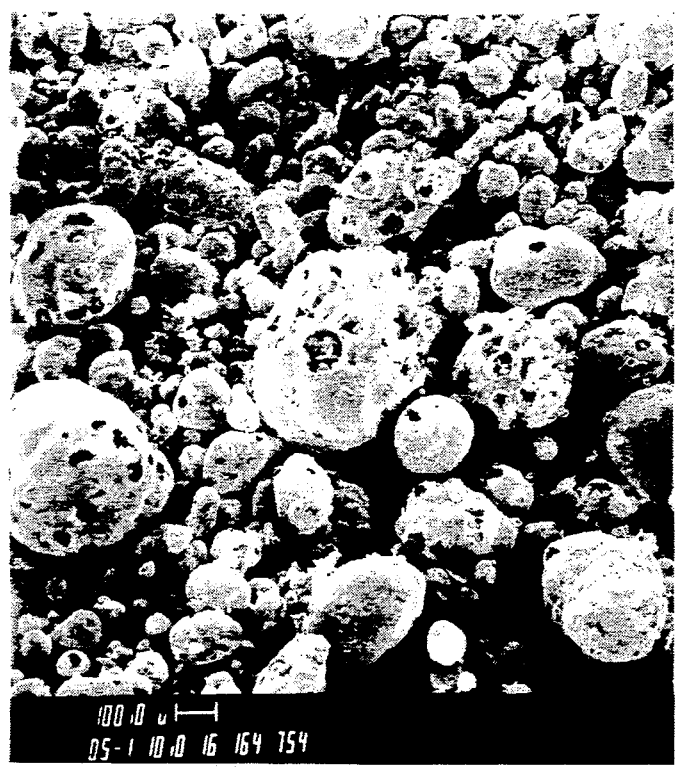
FIG. 5 is a photomicrograph of conventionally expanded perlite at a magnification of 50X.
Figure 6:
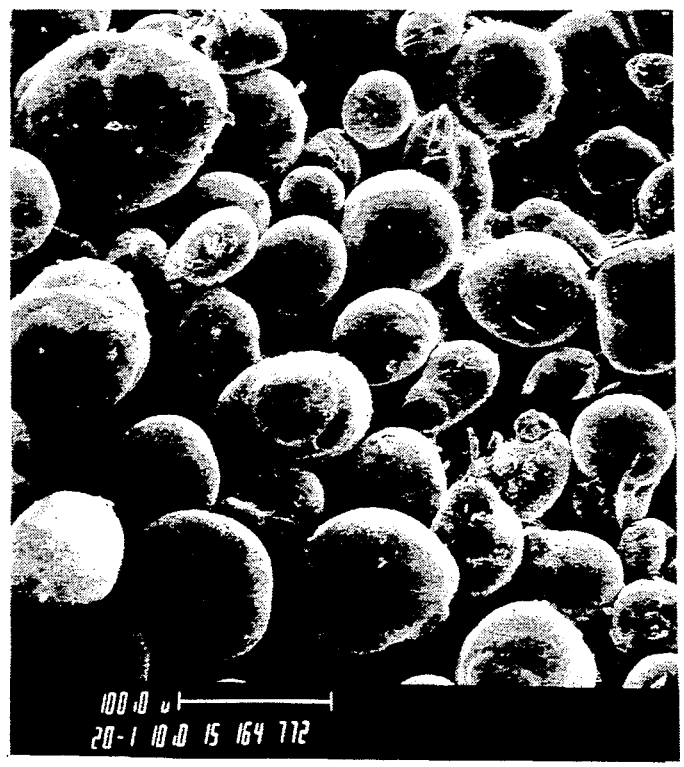
FIG. 6 is a photomicrograph at a magnification of 200X, taken of expanded perlite particles which have been expanded in accordance with the present invention.

FIG. 5 is a photomicrograph of conventionally expanded perlite particles at a magnification of 50X. FIG.

6 is a photomicrograph of expanded perlite particles expanded in accordance with the method of the present invention at a magnification of 200X. The starting materials were the same type of perlite ore with the same size distribution. At these magnifications it is clear that the FIG. 5 particles have holes, cracks, crevices, fissures and surface irregularities in comparison to the relatively smooth, more spherical particles of FIG. 6.

Figure 7:
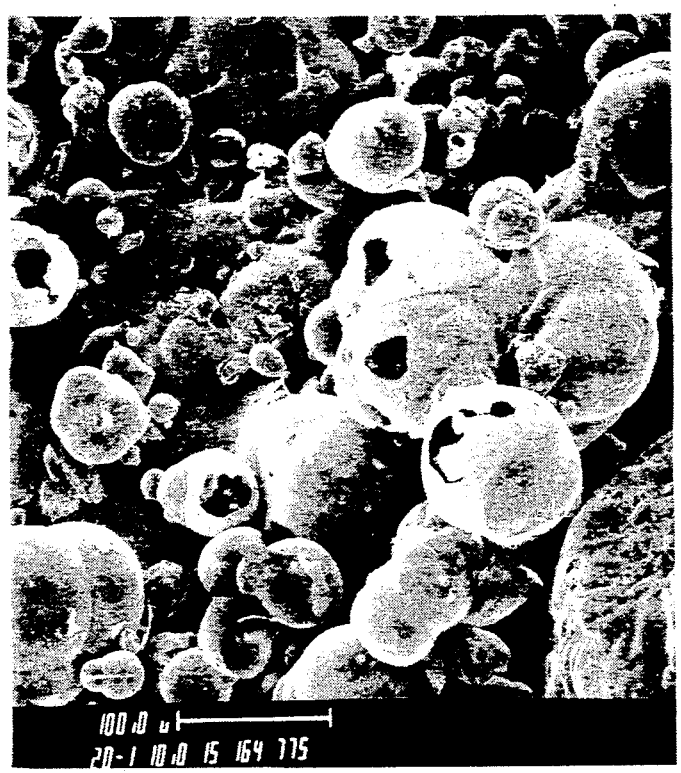
FIG. 7 is a photomicrograph, at a magnification of 200X, of conventionally expanded perlite particles.

FIG. 7 is a photomicrograph of conventionally expanded perlite particles achieved with the aid of an electron microscope at a magnification of 200X. At this magnification, visual inspection of the particles shows large openings in the surface which, in many instances, exceed 10 microns. When introduced into a liquid, the liquid almost immediately, that is, within minutes to hours depending upon the liquid's viscosity, penetrates into the particle causing a reduction in its lightweight character. This phenomenon is well known.

Figure 8:
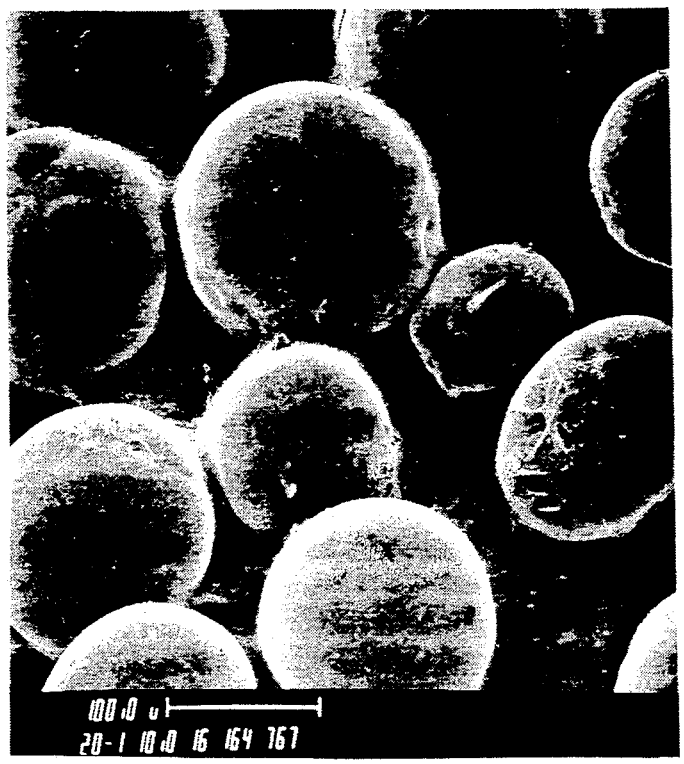
FIG. 8 is a second photomicrograph, at a magnification of 200X, of expanded particles which have been expanded in accordance with the present invention.

Referring to FIG. 8, a photomicrograph at a magnification of 200X, of perlite particles expanded in accordance with the method of the present invention, it is readily visually observable that these particles are substantially different from the FIG. 7 particles. For example, the FIG. 8 particles are all relatively spherical, relatively uniform in size and surface contour, and are distinguished by an absence of the holes, cracks, and crevices which are visible in FIG. 7. It is believed that these distinguishing features explain the outstanding short term durability of the particles of the present invention in comparison to that of conventionally expanded particles.

Figure 9:
FIG. 9 is a photomicrograph of a conventionally expanded perlite particle at a magnification of 800X.
Figure 10:
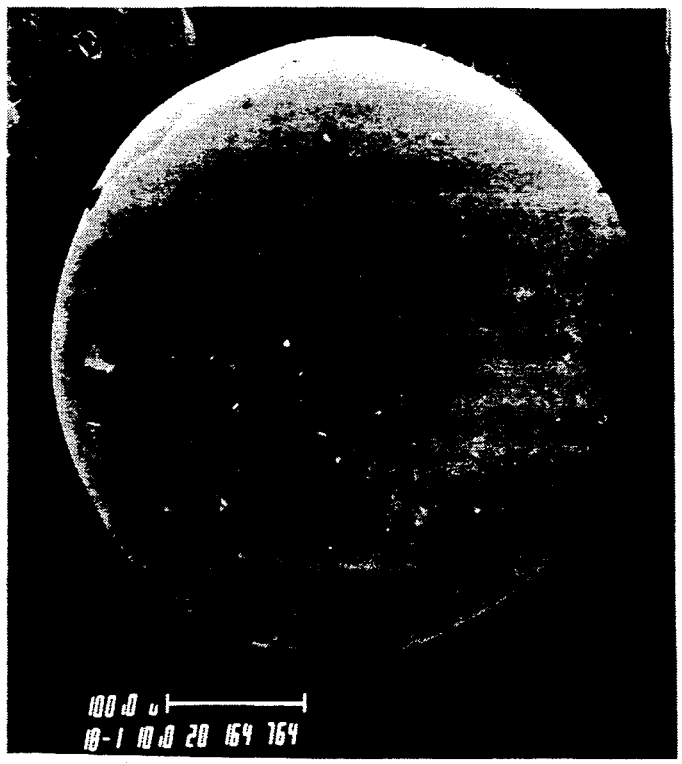
FIG. 10 is a photomicrograph of an expanded perlite particle of the present invention at a magnification of 180X.

Referring to FIGS. 9 and 10, photomicrographs of a conventionally expanded and present invention expanded perlite particle, respectively, are shown. The FIG. 9 photomicrograph is at a magnification of 800X and the FIG. 10 photomicrograph is at a magnification of 180X. The previously stated differences are even more clearly visible in these two photomicrographs which compare the surfaces features of two individual expanded particles.

A phenomenon related to durability and which was not previously believed to be understood was the observed continued loss of conventionally expanded perlite's lightweight character over days, weeks and/or months. Referring to FIGS. 11 and 12, which show the surface of conventionally expanded perlite at a magnification of 20,000X, it was discovered that the surface of conventionally expanded perlite is covered with numerous, randomly occurring small holes that are about 1 micron or smaller in mean diameter. It is believed that these pores are responsible for the long-term density instability in perlite expanded by conventional methods.

Also, as may be seen in FIGS. 7 and 9, and more clearly in FIGS. 11 and 12, the small, about 1 micron, holes on the surface of the conventional particles are almost non-existent on the surface of the FIGS. 8 and 10 particles of the present invention. It is believed that this feature of the expanded particles of the present invention explains the outstanding long-term durability characteristics of the particles of the present invention.

Within the scope of the present invention the term durability refers to a property associated with the use of filler particles in liquid systems. Specifically, the term refers to the ability of a particle-filled liquid system to maintain its density over time. This concept may also be referred to as density stability. When a liquid having certain density is mixed with relatively lightweight hollow particles such as expanded perlite, the initial density of the mixture is between that of the pure liquid and that of the pure particles. Over time and depending on the particles used and the viscosity of the liquid, liquid penetrates into the particles and fills up cavities within the particles. The measurable characteristic of this property is that the density of the mixture, or system as such mixture are often referred to, increases over time. Thus, density stability, or durability refers to the ability of a particle filled liquid mixture to retain its original mix density over time. In this context short term refers to minutes and hours whereas long term refers to days, weeks and months.

The expanded, coated and/or uncoated particles of the present invention exhibit outstanding improvements in both short term and long term durability in comparison to that of correspondingly sized particles expanded in a conventional manner. It is believed that these improvements are due to the surface characteristics of the particles of the present invention, as has been described with references to FIGS. 5-12.

In order to provide objective bases for comparison of the durability of the particles of the present invention, several tests have been devised to measure the stability properties of the present invention particles over time and will provide bases of comparison regarding other particles in the same field of invention. One such test is a short term stability test and a second test is a long term stability test.

In the short term stability test a quantity of conventionally expanded mineral product and the expanded mineral product of the present invention is mixed with a liquid such as a conventional polyester resin or a conventional latex emulsion to produce a thickened mixture. The density of each is measured in pounds per gallon. A vacuum of approximately 25" Hg is applied to the mixture for a specified time, such as for about 10 minutes, and then the vacuum is released. The density of the mixture is then determined as before and the pre-vacuum and post-vacuum results are compared. Porous particles will generally yield a significant increase in density due to the relatively rapid penetration of the liquid into the cavities of the particles whereas in mixtures having non-porous particles used as a filler, the density will either not increase or will increase only very slightly.

The second, or long term stability test is conducted by preparing samples of an emulsion or mixture as before, and allowing each mixture to remain in an oven at approximately 120° F. in an enclosed container for an extended period of time such as up to about 3 months. No vacuum is applied during the long term test. The density of each mixture is measured periodically during that time. Mixtures having porous particle fillers will exhibit density increases during this period of time. In contrast, however, mixtures having non-porous filler particles will not increase in density over this period of time or will exhibit only very small density increases. This test is useful in conjunction with typical organic polymers such as polyester resins, latex emulsions or other suitable emulsions.

By reference to the following specific examples, which have been prepared with a pilot plant scale furnace, the method and expanded particles of present invention will be further described. These examples are not to be construed as limitations of the present invention but rather are to illustrate specific methods and particles within the scope of the present invention. The pilot plant referred to has a vertically oriented, 5" I.D., ¼" thick, 10' long Incolloy 825 TM pipe to define its expansion chamber which extended along 8' of the 10' length of the pipe. The heating elements were arranged to produce nine heating zones, with six zones, each about 10" in length at the upstream end and three zones, each about 12" in length, at the downstream end. The six electric heaters in the top six zones were controlled by two groups of heater controllers, with each controller controlling three heaters. These top six heat zones functioned primarily as sources of preheat. The downstream three heaters were individually controlled and functioned primarily as a three zone heat expansion chamber where most of the particle expansion took place. The total heat capacity for the nine zones was about 24,000 watts and the feed ore was fed at up to 100 pounds per hour. The feeding and collection components were substantially identical to those shown in FIGS. 1–3.

Although the previous description has been directed to an apparatus for making expanded, uncoated perlite particles, the process of the present invention can be advantageously applied to the treatment of other known, thermally expandable materials such as pumice, pumicite, obsidian and other naturally occurring minerals having similar properties.

EXAMPLE I

A perlite ore feed having particles predominantly in the range of 44, or 325 mesh, to 15 microns was introduced into the furnace. The ore was introduced at the top of the cylindrical chamber at a rate of about 20 pounds per hour. Air assist was provided through the air injector at a rate of about 100 cubic feet per hour. The expansion was conducted within the expansion chamber where the electrical heating elements were adjusted to produce a temperature of about 1700° F. across the top zone of the expansion chamber within the retort. The electrical heating elements were adjusted so that the temperature gradients increased gradually up to 2100° F. at the bottom, or downstream end of the heated portion of the expansion chamber.

The expanded uncoated perlite particles were collected in a collection tank, and found to have a nominal density of 0.60 gm/cc by air comparison pycnometer measurement. Conventionally expanded uncoated perlite particles produced from the same feed in a conventional furnace had a nominal density of 1.05 gm/cc by air comparison pycnometer measurement.

The Example 1 expanded, uncoated perlite particles of the present invention were further subjected to a liquid flotation process in which the non-porous perlite particles floated and the reject perlite particles sank. After drying the particles which floated, a post-flotation yield of uncoated perlite particles in the amount of 79% of initial feed weight was obtained. This product had a nominal density of 0.48 gm/cc as measured by the air comparison pycnometer. The conventionally produced expanded, uncoated perlite particles were also subjected to the liquid flotation process and these dried, expanded perlite particles had a nominal density of 0.90 gm/cc by the air comparison pycnometer. Also, the conventionally produced expanded, uncoated perlite particles resulted in a post-flotation yield of only 55% of floating particles in relation to their original feed weight.

The expanded perlite particles of the present invention having a nominal density of 0.48 gm/cc were then mixed with a conventional latex emulsion to form a mixture. The density of the mixture was measured. Next a vacuum of 25" Hg was applied for 10 minutes and released. The mixture exhibited a 1.7% increase in density after the vacuum was applied and released. Similarly sized, conventionally expanded perlite particles were treated in the same way and these particles exhibited an 11.3% increase in mixture density, using the same liquid. The following Table II contains the results of these comparisons.

TABLE II

| | Uncoated, Expanded Particles | | |
|---|---|---|---|
| | Conventional | Present Invention | Percent Difference |
| Expanded product nominal density | 1.05 gm/cc | 0.60 gm/cc | 43% |
| Float product nominal density | 0.90 gm/cc | .48 gm/cc | 47% |
| Float yield, % | 55% | 79% | 44% |
| Vacuum test, nominal density % change | 11.3% | 1.7% | 85% |

Other samples of coated conventionally expanded perlite particles and uncoated expanded perlite particles of the present invention were also conventionally coated, floated and tested. Test data for these other coated conventionally expanded particles and coated particles of the present invention are set forth below in Table III.

TABLE III

| | Coated, Expanded Particles | | |
|---|---|---|---|
| | Conventional | Present Invention | Percent Difference |
| Expanded product nominal density | 1.28 gm/cc | 0.33 gm/cc | 74% |
| Float product nominal density | 1.24 gm/cc | .26 gm/cc | 79% |
| Float yield, % | 97% | 95% | 2% |
| Vacuum test, nominal density % change | 10.8% | .8% | 93% |

EXAMPLE II

Processed perlite feed ore having particle sizes predominantly in the range of minus 420 microns, or 40 mesh, to 44 microns, or 235 mesh was introduced from the volumetric feeder to the top of the furnace at the rate of 12 pounds per hour using an air injector air flow rate of 100 cubic feet per hour directed downward from the top of the retort. A temperature range from of 1700° F. at the top of the expansion chamber to 2,000° F. at the bottom of the expansion chamber was employed. The expanded particles were collected in a collection tank.

The resulting expanded, uncoated perlite particles exhibited an air comparison pycnometer nominal density of 0.45 gm/cc. After application of the flotation process, the expanded perlite particles had an air comparison pycnometer nominal density of 0.28 gm/cc and were produced at a post-flotation yield of 74% in comparison to the initial feed weight. A sample of this expanded perlite material was mixed with a conventional latex emulsion to form a mixture and was allowed to remain in a closed jar for 38 days at 120° F. During that time the density of the mixture increased only 2% while conventionally expanded perlite particles treated the same way resulted in a mixture density increase of 14.9% in only 9 days.

EXAMPLE III

Processed perlite feed ore having a particle size range of essentially 420 microns, or 40 mesh, to 44 microns, or 325 mesh was introduced into the furnace at the expansion chamber at a rate of 20 pounds/hour. The air injector fed in assist air at the rate of 100 cubic feet per hour. A gradual temperature increase from 1100.° F. at the top of the expansion chamber to 2000° F. at the bottom of the expansion chamber was produced by controlling the electrical heating elements, as previously described. The expanded, uncoated perlite particles of the present invention were collected in the collection tank. These particles exhibited an air comparison pycnometer nominal density of 0.34 gm/cc. The particles were subjected to the flotation separation process using water as the liquid, and the floated product exhibited a nominal density of 0.26 gm/cc and with a post-flotation yield of 75% based on initial feed weight. The expanded perlite particles having the nominal density of 0.26 gm/cc were introduced into a conventional latex emulsion to form a mixture and its density was measured. A vacuum of 25" Hg was applied for approximately 10 minutes then released. The mixture containing expanded particles of the present invention exhibited only a 0.8% increase in density. A similarly sized, conventionally expanded, uncoated perlite particle mixture treated in the same way exhibited a 10.8% increase in mixture density.

The specific test procedures and equipment used for the evaluations of long term and short term durability will now be discussed.

Air Comparison Pycnometer Measurement of Nominal Density

In this measurement a Beckman, Model 930 air comparison pycnometer or its equivalent is used.

Figure 13:
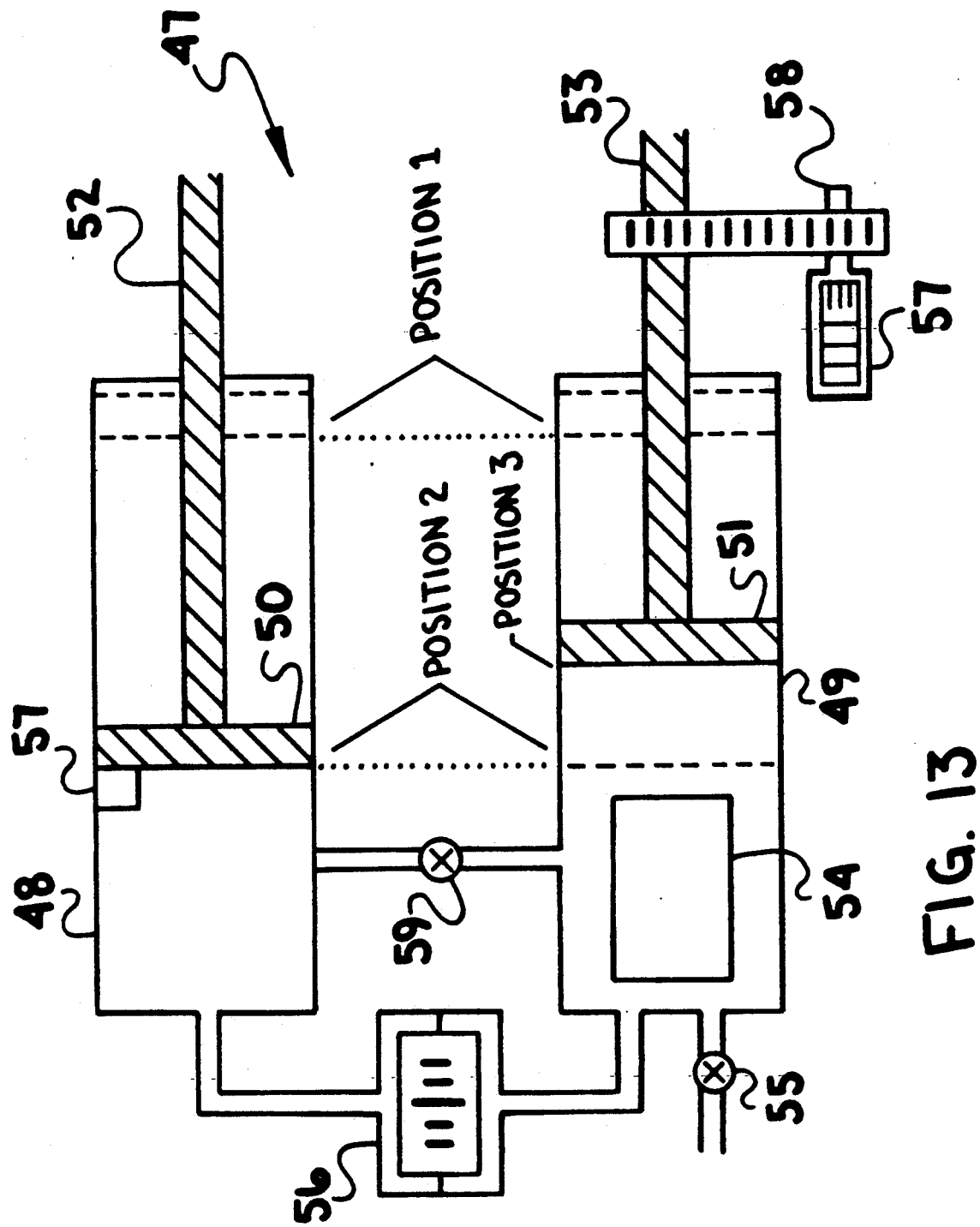
FIG. 13 is a schematic diagram of an air comparison pycnometer used in nominal density measurements associated with the present invention.

By reference to FIG. 13 the air comparison pycnometer 7 is schematically shown. Cylinders 48 and 49 contain pistons 50 and 51 which are attached to hand wheels 52 and 53 as indicated. A weighted sample of solid material such as expanded mineral particles is placed in a cylindrical container 54 which is inserted and secured in cylinder 49. After securing the sample container within cylinder 49, fifteen seconds is allowed to pass and valve 55 is closed. The two hand wheels 52 and 53 are placed in position 1 and then rotated counterclockwise while keeping the indicating whisker of the differential pressure indicator 56 within the scale shown on the indicator. When the reference handwheel 52 abuts stop 57 and ceases to turn, as shown in position 2, the measuring handwheel 53 also stops. After ten seconds, the indicating whisker on the differential pressure indicator 56 is brought to zero on the indicator, i.e., at position 3, using the measuring handwheel 53. The volume is read from the counter 57 as Vx, which is in cubic centimeters.

The air comparison pycnometer specific gravity is found by calculating:

$$\frac{\text{Weight of Sample in grams}}{(Vx) \text{ Volume in cc From Counter}} = D \text{ (nominal density in gm/cc)}$$

Each air comparison pycnometer is manufactured with a definite, known volume to which the counter is set prior to measuring the specific gravity of a sample. This volume must be set on the counter using the measuring handwheel before each measurement. The reference handwheel must be set as far clockwise as it will comfortably turn before proceeding. The air comparison pycnometer should be calibrated from time to time with steel balls of known volume. The counter can be zeroed by inserting the empty cylindrical container 54 and proceeding as described as above. The measuring handwheel will stop somewhere around zero and if not zero, can be adjusted to zero by the zero set screw 58 using a small screwdriver. Air equalizing valve 59 is also shown in FIG. 13.

Long Term Stability Test

Any liquid which is chemically inert to the expanded mineral particles may be used for this test provided that its viscosity range is between 25,000 to 100,000 centipoise. Such a viscosity range renders the liquid somewhat fluid and easier to handle yet not so fluid that hollow microspheres or other test particles added to it have the tendency to float to the surface. Typical liquids are conventional polyester resins, latex emulsions or any other suitable emulsion.

Prior to the test, the density of the liquid is measured by filling a vessel of known volume with mixture and weighing. With the weight and volume of the mixture known, the density of the mixture can be calculated. Units such as pounds/cubic foot, gm/cc or pounds/gallon may be used.

The test procedure is as follows:
1. A sample of 2.5 grams of the chosen particles are carefully mixed with 121.9 grams of the liquid in a suitable vessel such as a plastic cup or beaker.
2. The mixture is transferred to a tared vessel of known volume. The filled vessel is weighed and the density in gm/cc is calculated. A metal cylinder is available for this purpose and is exactly 83.45 cc in volume. The weight of the liquid filling this cylinder is divided by 83.45 to get the density in gm/cc.
3. The mixture is transferred to a capped jar to prevent loss of moisture and then is weighed.
4. The capped jar is placed in an oven kept at 120° F.
5. At the end of a week, or other chosen time period, the sample jar is removed, allowed to cool to room temperature, weighed and the density of an aliquot determined and recorded as in step 2.
6. The aliquot is then returned to the jar, which is then capped. The jar is again weighed and placed in the oven at 120° F.
7. The above cycle is repeated each week, or other time cycle, for the time period of interest. Six to twelve weeks is usually sufficient.
8. Non-porous, hollow particles will exhibit relatively small changes in mixture density compared to relatively large changes in mixture density exhibited by porous, hollow particles.

Short Term Stability Test

Any liquid or emulsion which is chemically inert to the particles of interest may be used for this test provided that its viscosity ranges between 25,000 to 100,000 centipoise. Such a viscosity range renders the emulsion somewhat fluid and easier to handle yet not so fluid that hollow microspheres or other particles added to it have the tendency to float to the surface.

Prior to the test, the density of the liquid is determined by filling a vessel of known volume, weighing and calculation the bulk density of the emulsion in gm/cc. Other units such as pounds/cubic foot or pounds/gallon may be used.

The test procedure is as follows:

1. A sample weighing 2.5 grams of the hollow particles are carefully mixed with 121.9 grams of the emulsion in a suitable vessel such as a plastic cup or beaker.
2. A portion of the mixture is transferred to tared vessel of known volume, weighted, and the bulk density in gm/cc is calculated.
3. A metal cylinder is available for this purpose and is exactly 83.45 cc in volume. The weight of the liquid filling this cylinder is divided by 83.45 to get the density in gm/cc. This cylinder is known, especially in the paint industry, as a "weight-per-gallon cup." The mixture is returned to the original vessel and the vessel is placed in Bell jar, large vacuum desiccator or other suitable apparatus.
4. Bell jar is evacuated by a vacuum pump to 25" Hg and is held at this level of vacuum for 10 minutes.
5. The vacuum is smoothly but rapidly released and the sample removed after equilibration is reached.
6. The density of the sample is again measured as described before, and compared with the original density. Only relatively small changes will be noted with non-porous, particle mixtures, while mixtures having porous particles will show relatively large changes in density.

I claim:

1. An expanded mineral product comprising:
mineral particles made from the group consisting of perlite, pumice, pumicite, pitchstone, obsidian and volcanic ash and which have been expanded to a greater volume then the volume of the particles prior to expansion,
said expanded mineral product particles being uncoated, having a substantially smooth, non-porous surface and a nominal density less than about 2.0 gram/cc. as measured by air comparison pycnometer, and
said particles having the property that when mixed with an emulsion or liquid which is chemically inert to said particles and which has a viscosity in the range of about 25,000 to 100,000 centipoise and at about 2% by weight of said particles to said liquid to form a mixture, said mixture is subjected to a vacuum of about 25" Hg for 10 minutes and then released, the density change of said liquid is less than 10%.

2. The expanded mineral product of claim 1 which when mixed with the liquid or emulsion to form the mixture to which the 10-minute vacuum is applied, results in a mixture density change of less than 5%.

3. The expanded mineral product of claim 1 which, mixed with the liquid or emulsion to form the mixture to which the 10-minute vacuum is applied, results in a mixture density change of between 1% and 8%.

4. The expanded mineral product of claim 1 which, when mixed with the liquid to form the mixture held at a temperature of about 120° F. for one month, results in a mixture density change of between 1% and 8%.

5. The expanded mineral product of claim 1, said particles having the additional property that
when mixed with a liquid which is chemically inert to said particles and which has a viscosity in the range of 25,000 to 100,000 centipoise and at about 2% by weight of said particles to said liquid to form a mixture and said mixture is held at a temperature of 120° F. for one month,
results in a mixture density change of less than 10%.

6. An expanded mineral product comprising:
mineral particles made from the group consisting of perlite, pumice, pumicite, pitchstone, obsidian and volcanic ash and which have been expanded to a greater volume than the volume of the particles prior to expansion,
said particles being uncoated, having a substantially smooth, non-porous surface and a nominal density less than 2.0 gram/cc as measured by air comparison pycnometer, and
said particles having the property that when mixed with a liquid which is chemically inert to said particles and having a viscosity between 25,000 and 100,000 centipoise and at about 2% by weight of said liquid to form a mixture and said mixture is held at a temperature of 120° F. for one month,
results in a mixture density change of less than 10%.

7. The expanded mineral product of claim 6 which, when mixed with the liquid to form the mixture held at the temperature of about 120° F. for one month, results in a mixture density change of less than 5%.

8. The expanded mineral product of any of claims 1, 5 or 6 having a nominal density of about 0.05–2.0 gm/cc as measured by air comparison pycnometer.

9. The expanded mineral product of any of claims 1, 5 or 6 having a nominal density of 0.10–1.0 gm/cc as measured by air comparison pycnometer.

10. The expanded mineral product of any of claims 1, 5 or 6 having a nominal density of 0.15–0.70 gm/cc as measured by air comparison pycnometer.

11. The expanded mineral product of any of claims 1, 5 or 6 wherein the expanded mineral particles have a particle size below 9520 microns.

12. The expanded mineral product of any of claims 1, 5 or 6 wherein the expanded mineral particles have a particle size within the range of 5–9520 microns.

13. The expanded mineral product of any of claims 1, 5 or 6 wherein the expanded mineral particles having a particle size below 1000 microns.

14. The expanded mineral product of any of claims 1, 5 or 6 wherein the expanded mineral particles having a particle size within the range 5–1,000 microns.

15. The expanded mineral product of any of claims 1, 5 or 6 wherein the expanded mineral particles have a particle size below 840 microns.

16. The expanded mineral product of any of claims 1, 5 or 6 wherein the expanded mineral particles have a particle size within the range 5–840 microns.

17. The expanded mineral product of any of claims 1, 5 or 6 wherein the expanded mineral particles have a particle size below 210 microns.

18. The expanded mineral product of any of claims 1, 5 or 6 wherein the expanded mineral particles have a particle size within the range 5–210 microns.

19. The expanded mineral product of any of claims 1, 5 or 6 wherein the expanded mineral particles have a particle size below 149 microns.

20. The expanded mineral product of any of claims 1, 5 or 6 wherein the expanded mineral particles have a particle size within 3–149 microns.

21. The expanded mineral product of any of claims 1, 5 or 6 wherein the expanded mineral particles have a particle size below 105 microns.

22. The expanded mineral product of any of claims 1, 5 or 6 wherein the expanded mineral particles have a particle size within the range of 3-105 microns.

23. The expanded mineral product of any of claims 1, 5 or 6 wherein the expanded mineral particles have a particle size below 44 microns.

24. The expanded mineral product of any of claims 1, 5 or 6 wherein the expanded mineral particles have a particle size within the range of 3-53 microns.

25. The expanded mineral product of any of claims 1, 5 or 6, said particles further having
a substantially spherical shape.

26. The expanded mineral product of any of claims 1, 5 or 6, said particles further having
a substantially continuous, spherical surface and a hollow interior.

* * * * *